United States Patent
Fricke

(10) Patent No.: US 10,286,945 B2
(45) Date of Patent: May 14, 2019

(54) ADJUSTABLE STEERING COLUMN ASSEMBLY

(71) Applicants: THYSSENKRUPP PRESTA AG, Eschen (LI); THYSSENKRUPP AG, Essen (DE)

(72) Inventor: Sascha Fricke, Alstätten (CH)

(73) Assignees: thyssenkrupp AG, Essen (DE); THYSSENKRUPP PRESTA AG, Eschen (LI)

( * ) Notice: Subject to any disclaimer, the term of this patent is extended or adjusted under 35 U.S.C. 154(b) by 100 days.

(21) Appl. No.: 15/725,547

(22) Filed: Oct. 5, 2017

(65) Prior Publication Data

US 2019/0106142 A1  Apr. 11, 2019

(51) Int. Cl.
  *B62D 1/184* (2006.01)
  *B62D 1/187* (2006.01)

(52) U.S. Cl.
  CPC .............. *B62D 1/184* (2013.01); *B62D 1/187* (2013.01)

(58) Field of Classification Search
  CPC .................................. B62D 1/184; B62D 1/187
  See application file for complete search history.

(56) References Cited

U.S. PATENT DOCUMENTS

| 6,419,269 | B1 * | 7/2002 | Manwaring | B62D 1/184 280/775 |
| 8,474,869 | B2 | 7/2013 | Sulser et al. | |
| 9,150,241 | B2 * | 10/2015 | Nakazato | B62D 1/187 |
| 10,189,497 | B2 * | 1/2019 | Butler | B62D 1/184 |
| 2004/0104565 | A1 | 6/2004 | Tsuji et al. | |
| 2007/0068311 | A1 * | 3/2007 | Shimoda | B62D 1/184 74/493 |
| 2012/0266715 | A1 * | 10/2012 | Okada | B62D 1/184 74/493 |
| 2012/0266716 | A1 | 10/2012 | Sulser et al. | |
| 2014/0284909 | A1 | 9/2014 | Nakazato et al. | |

(Continued)

FOREIGN PATENT DOCUMENTS

DE   102006028832 A1   12/2007
EP   2105369 A2   9/2009

(Continued)

OTHER PUBLICATIONS

PCT Application No. PCT/EP2018/076233, International Search Report dated Jan. 3, 2019, 34 pages.

*Primary Examiner* — Drew J Brown
(74) *Attorney, Agent, or Firm* — Lathrop Gage L.L.P.

(57) ABSTRACT

One steering column assembly for use with a vehicle includes a steering shaft; a bracket having a base and an arm; a jacket supporting the steering shaft and having a locking assembly; and a stop. The arm has an adjustment slot and upper and lower brakes separated from one another by empty space. The jacket has an axle passage, and the locking assembly has a shaft passing through the axle passage and the adjustment slot. The stop is located along the jacket adjacent the arm in the empty space, such that the stop contacts the upper and lower brakes before the shaft reaches upper and lower ends of the adjustment slot. The stop has a main body with passenger-facing and forward-facing ends, an upper leaf spring extending above the main body, and a lower leaf spring extending below the main body.

20 Claims, 5 Drawing Sheets

(56) References Cited

U.S. PATENT DOCUMENTS

| | | | |
|---|---|---|---|
| 2015/0027263 A1* | 1/2015 | Kern | B62D 1/184 74/495 |
| 2016/0059879 A1 | 3/2016 | Tagaya et al. | |
| 2018/0037250 A1* | 2/2018 | Kreutz | B62D 1/184 |

FOREIGN PATENT DOCUMENTS

| | | |
|---|---|---|
| JP | 2002145078 A | 5/2002 |
| WO | 2017005535 A1 | 1/2017 |

* cited by examiner

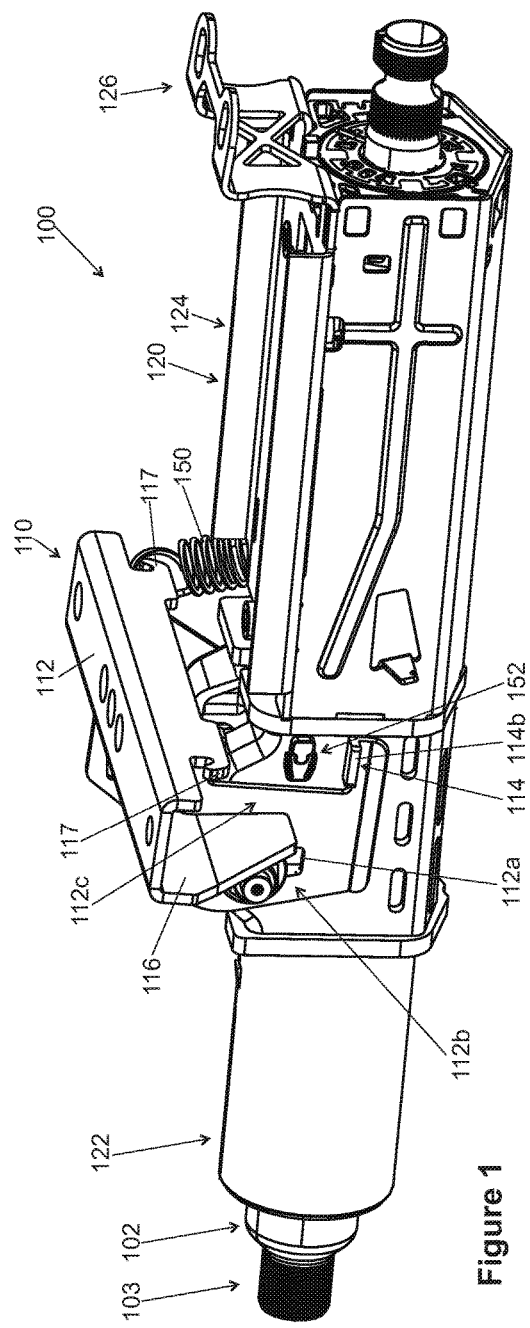
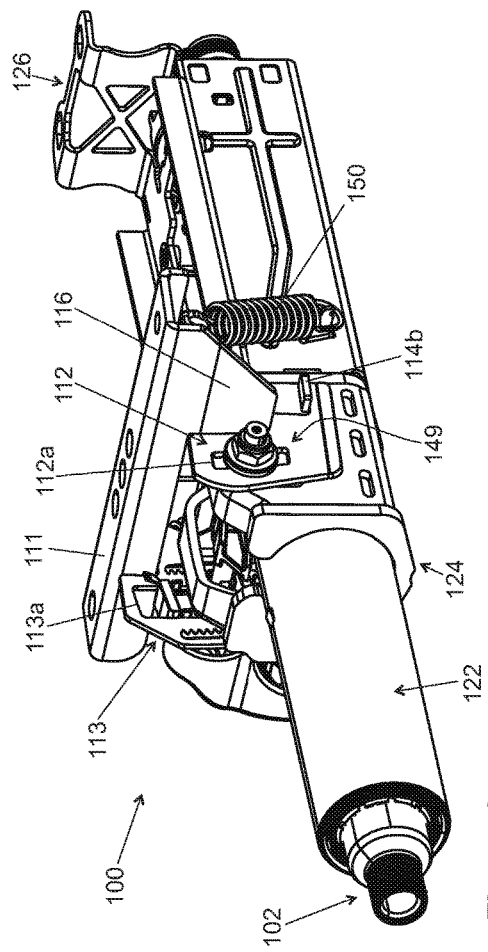
Figure 1
Figure 2

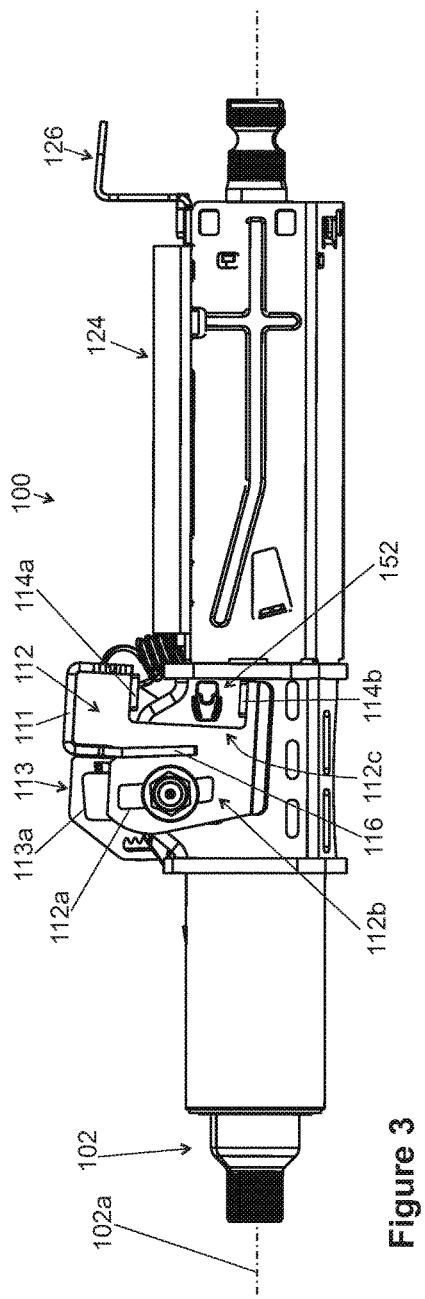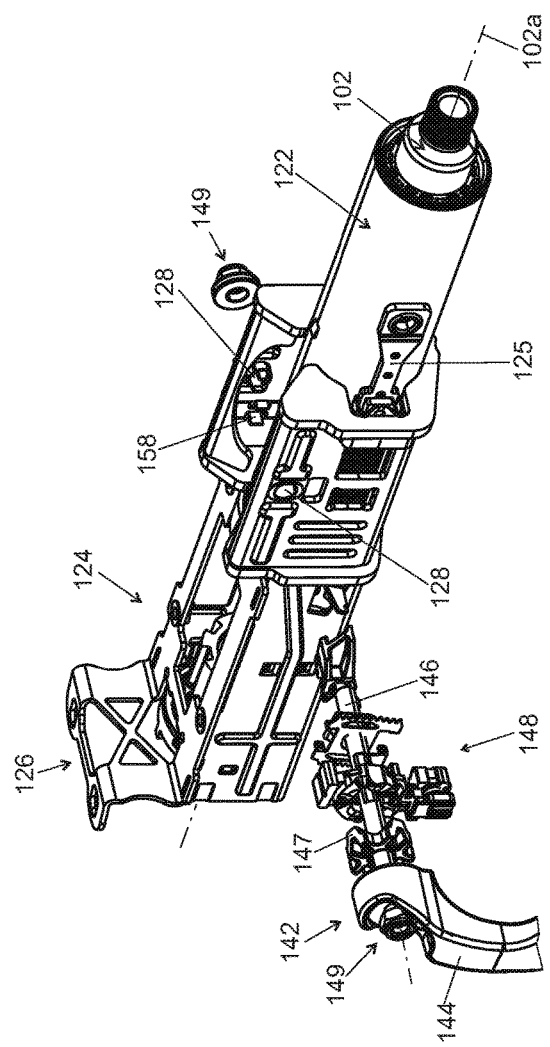

ADJUSTABLE STEERING COLUMN ASSEMBLY

FIELD OF THE DISCLOSURE

The disclosure relates generally to the field of steering column assemblies for motor vehicles. More specifically, the disclosure relates to adjustable steering column assemblies.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a steering column assembly for use with a vehicle includes a steering shaft, a bracket, a jacket, and a stop. The bracket has a base and a first arm extending from the base, and the base is configured to be anchored to a chassis of the vehicle. The first arm has an adjustment slot, and the first arm has upper and lower brakes separated from one another by empty space. The jacket rotatably supports the steering shaft and has an inner portion, an outer portion, and a locking assembly for maintaining the jacket in various respective positions relative to the bracket. The outer portion has an axle passage positioned between the inner portion and the bracket base, and the locking assembly has a shaft passing through the axle passage and the adjustment slot of the first arm. The stop is located along the jacket adjacent the first arm in the empty space between the upper and lower brakes, and the stop is located away from the adjustment slot of the first arm. The stop has a main body, an upper leaf spring extends above the main body, and a lower leaf spring extends below the main body.

In an embodiment, the upper leaf spring extends from a first end of the main body toward a second end of the main body. And the lower leaf spring extends from the first end of the main body toward the second end of the main body. The stop is located such that the stop contacts the upper brake before the shaft reaches an upper end of the adjustment slot when the jacket is moved upwardly relative to the bracket, and the stop is located such that the stop contacts the lower brake before the shaft reaches a lower end of the adjustment slot when the jacket is moved downwardly relative to the bracket.

In an embodiment, the upper leaf spring extends from an area of the main body that is below an uppermost area of the main body.

In an embodiment, the lower leaf spring extends from an area of the main body that is above a lowermost area of the main body.

In an embodiment, at least one item selected from the group consisting of a clip, a bolt, a weld, and adhesive couples the stop to the jacket outer portion.

In an embodiment, the bracket has a stiffener located between the adjustment slot of the first arm and the empty space between the upper and lower brakes. And the stiffener extends from the bracket base.

In an embodiment, the stop includes first and second extensions. The first extension extends from the upper leaf spring in a direction away from the second end and toward the first end. And the second extension extends from the lower leaf spring in a direction away from the second end and toward the first end.

In an embodiment, a first bend couples the first extension to the upper leaf spring and a second bend couples the second extension to the lower leaf spring.

In an embodiment, a spring rate of the first extension is greater than a spring rate of the upper leaf spring and a spring rate of the second extension is greater than a spring rate of the lower leaf spring.

In an embodiment, the main body of the stop touches the jacket outer portion. But the upper leaf spring and the lower leaf spring do not touch the jacket outer portion.

In an embodiment, the stop is constructed of at least one material selected from the group consisting of resin, natural rubber, synthetic rubber, and other polymers.

In an embodiment, the bracket includes a second arm extending from the base, with the second arm having an adjustment slot and the shaft passing through the adjustment slot of the second arm.

In one arrangement, the first end of the main body is a passenger-facing end and the second end of the main body is a forward-facing end. In other arrangements, the first end of the main body is the forward-facing end and the second end of the main body is the passenger-facing end.

According to another embodiment, a steering column assembly for use with a vehicle includes a steering shaft, a bracket, a jacket, and a stop. The bracket has a base and a first arm extending from the base, and the base is configured to be anchored to a chassis of the vehicle. The first arm has an adjustment slot and upper and lower brakes separated from one another by empty space. The jacket rotatably supports the steering shaft and has an inner portion, an outer portion, and a locking assembly for maintaining the jacket in various respective positions relative to the bracket. The outer portion has an axle passage positioned between the inner portion and the bracket base, and the locking assembly has a shaft passing through the axle passage and the adjustment slot of the first arm. The stop is located along the jacket adjacent the first arm in the empty space between the upper and lower brakes. The stop has a main body with a first end a second end, an upper leaf spring extending above the main body, and a lower leaf spring extending below the main body. The upper leaf spring extends from the first end toward the second end, and the lower leaf spring extends from the first end toward the second end. The stop is located such that the stop contacts the upper brake before the shaft reaches an upper end of the adjustment slot when the jacket is moved upwardly relative to the bracket, and the stop is located such that the stop contacts the lower brake before the shaft reaches a lower end of the adjustment slot when the jacket is moved downwardly relative to the bracket.

In an embodiment, the main body of the stop touches the jacket outer portion. But the upper leaf spring and the lower leaf spring do not touch the jacket outer portion.

In an embodiment, the stop is located such that the upper leaf spring contacts the upper brake before the shaft reaches an upper end of the adjustment slots when the jacket is moved upwardly relative to the bracket. And the stop is located such that the lower leaf spring contacts the lower brake before the shaft reaches a lower end of the adjustment slots when the jacket is moved downwardly relative to the bracket.

In an embodiment, the bracket has a stiffener located between the adjustment slot of the first arm and the empty space between the upper and lower brakes. The stiffener extends from the bracket base.

In an embodiment, the stop includes first and second extensions. The first extension extends from the upper leaf spring in a direction away from the second end and toward the first end. And the second extension extends from the lower leaf spring in a direction away from the second end and toward the first end.

In an embodiment, a first bend couples the first extension to the upper leaf spring and a second bend couples the second extension to the lower leaf spring.

In an embodiment, a spring rate of the first extension is greater than a spring rate of the upper leaf spring and a spring rate of the second extension is greater than a spring rate of the lower leaf spring.

In an embodiment, the bracket has a stiffener located between the adjustment slot of the first arm and the empty space between the upper and lower brakes. The stiffener extends from the bracket base.

In one arrangement, the first end of the main body is a passenger-facing end and the second end of the main body is a forward-facing end. In other arrangements, the first end of the main body is the forward-facing end and the second end of the main body is the passenger-facing end.

BRIEF DESCRIPTION OF THE SEVERAL
VIEWS OF THE DRAWINGS

FIG. 1 is a perspective view showing an adjustable steering column assembly, according to an embodiment of the present disclosure.

FIG. 2 is another perspective view showing the adjustable steering column assembly of FIG. 1.

FIG. 3 is a side view showing the adjustable steering column assembly of FIG. 1.

FIG. 4 an exploded view showing the adjustable steering column assembly of FIG. 1, with the bracket omitted for clarity.

Figure 5:
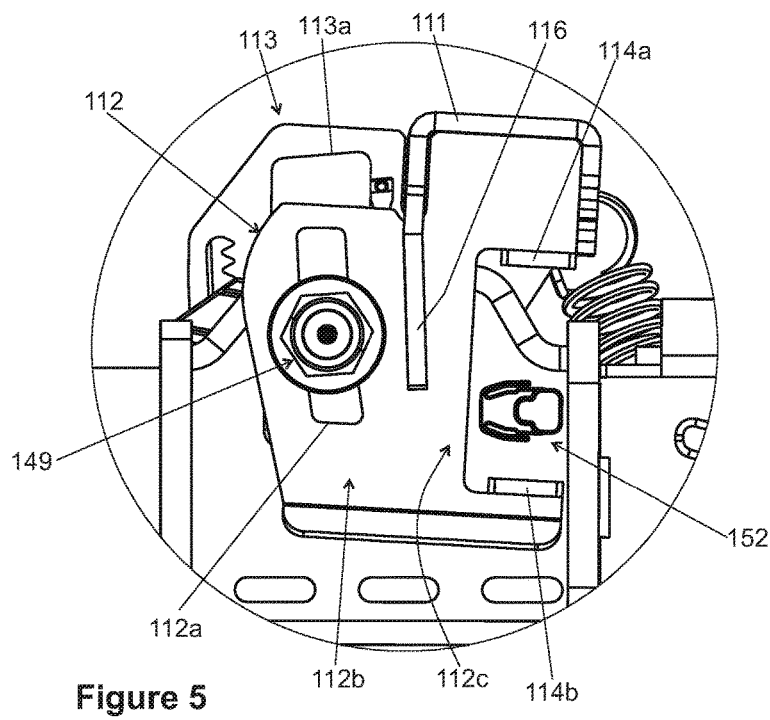

FIG. 5 is a partial view taken from FIG. 3.

Figure 6:
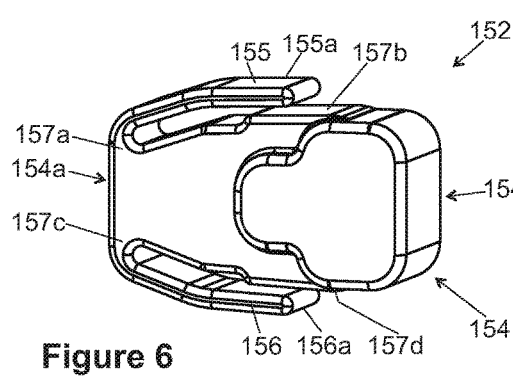

FIG. 6 is a perspective view showing a stop taken from the adjustable steering column assembly of FIG. 1.

Figure 7:
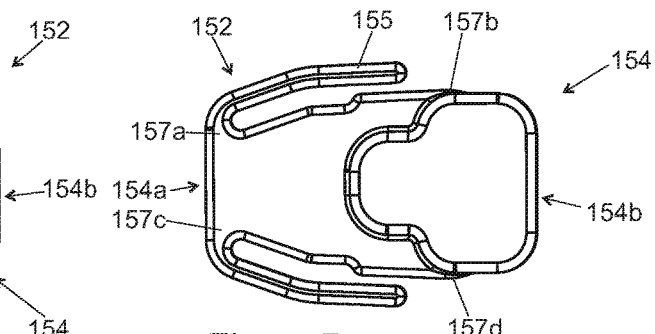

FIG. 7 is a side view showing the stop of FIG. 6.

Figure 8:
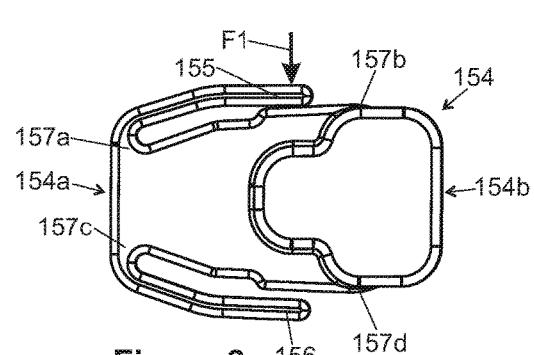

FIG. 8 is a side view showing the stop of FIG. 6, at one deformed configuration.

Figure 9:
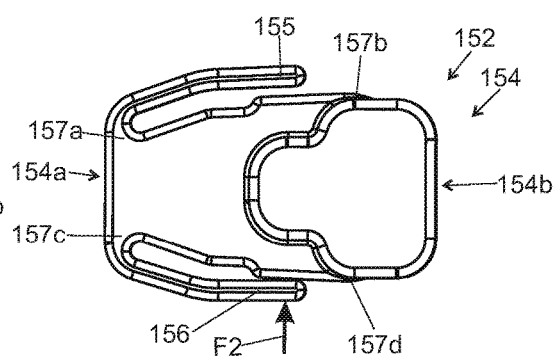

FIG. 9 is a side view showing the stop of FIG. 6, at another deformed configuration.

Figure 10:
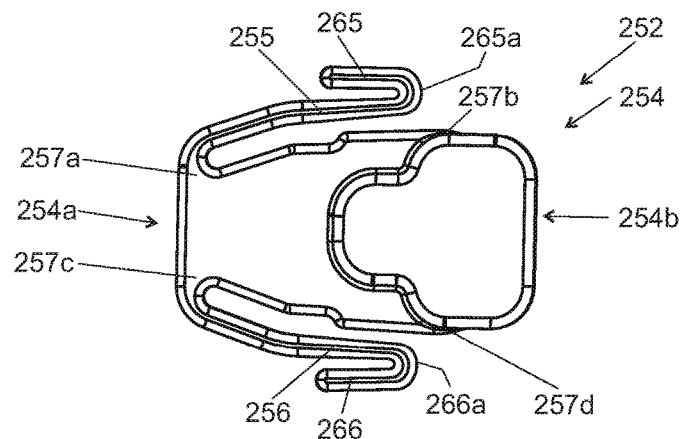
Figure 11:
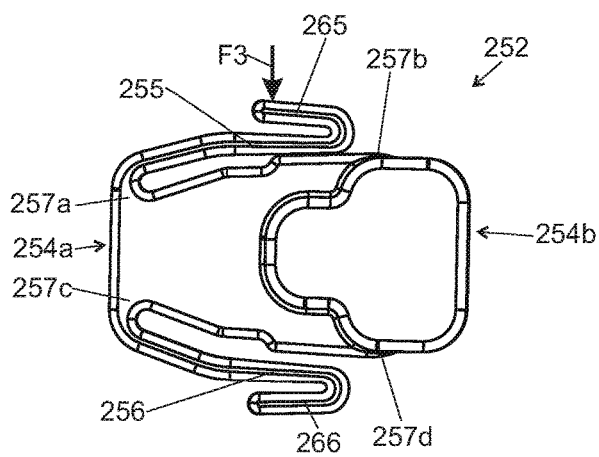
Figure 12:
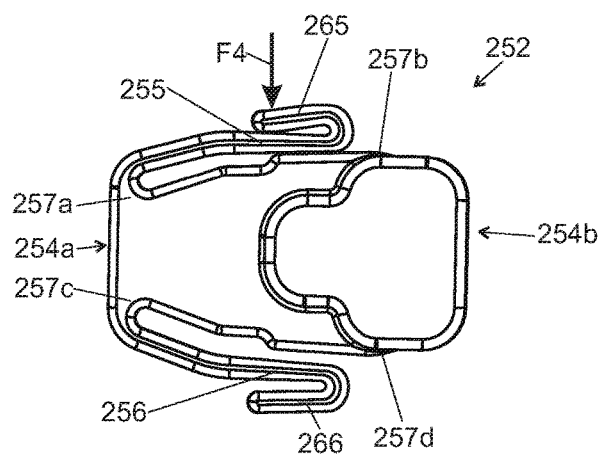
Figure 13:
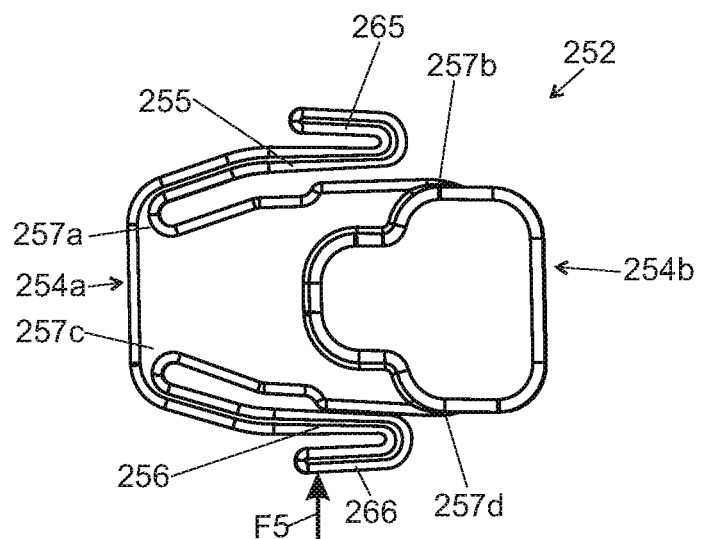
Figure 14:
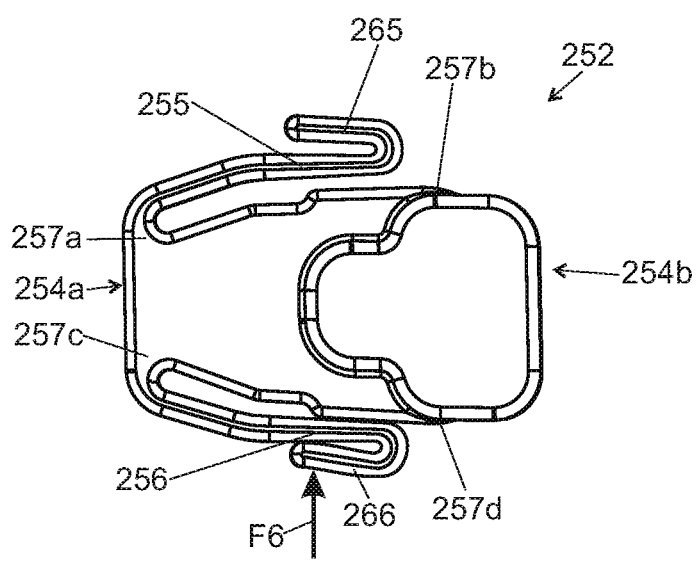

FIG. 10 is a side view showing a stop according to another embodiment of the present disclosure, for use with the adjustable steering column assemblies of the present disclosure.

FIGS. 11 through 14 are side views showing the stop of FIG. 10 at various deformed configurations.

DETAILED DESCRIPTION

FIGS. 1 through 9 illustrate an adjustable steering column assembly 100, according to one embodiment. The steering column assembly 100 broadly includes a bracket 110 and a jacket 120 rotatably supporting a steering shaft 102 about a longitudinal axis 102a of the steering shaft 102. A steering wheel is coupled (directly or indirectly) to end 103 of the steering shaft 102, and rotation of the steering wheel causes the steering shaft 102 to rotate—which ultimately causes an automobile having the steering column assembly 100 to turn. The bracket 110 is able to be anchored to a vehicle chassis, and the jacket 120 is allowed to tilt and lock relative to the bracket 110. Accordingly, a driver is able to incline the steering wheel in accordance with his preferences, though only along a predetermined range of motion. Typically, reaching the end of the predetermined range of motion in prior art devices results in a sudden, blunt impact and also an audible noise; and, though irritating, part of that impact and noise may be transmitted to the user. Various embodiment of the current disclosure may avoid or minimize such irritations.

The bracket 110 has a base 111 for fastening to a vehicle's chassis or other environmental structure, such as through welding, bolts, or any other appropriate fastener, whether now known or later developed. And a first arm 112 and a second arm 113 fixedly extend from the base 111. Each arm 112, 113 includes a respective adjustment slot 112a, 113a, and at least one of the arms 112, 113 has braking structure 114. In some embodiments, the arms 112, 113 are substantially mirror images of one another, while in other embodiments the arms 112, 113 differ more significantly. In the embodiment 100, the adjustment slot 112a has a smaller width than the adjustment slot 113a, and only the arm 112 is shown having the braking structure 114.

The braking structure 114 includes upper and lower brakes 114a, 114b separated from one another by empty space. The distance between the upper and lower brakes 114a, 114b limits the amount of travel of the jacket 120 relative to the bracket 110, as explained in more detail below. It may be desirable for the upper and lower brakes 114a, 114b to be bent or otherwise formed to extend outwardly (away from a vertical centerline), as shown in FIGS. 1 and 2; this may provide enhanced stability as well as increase the surface area of the brakes 114a, 114b.

Additional features, such as stiffening elements 116, anchor points 117, et cetera, may further be included in the bracket 110 as desired. In adjustable steering column assembly 100, the stiffening element 116 is located between the adjustment slot 112a and the empty space between the upper and lower brakes 114a, 114b, in effect defining passenger-facing and forward-facing portions 112b, 112c of the arm 112. This positioning of the stiffening element 116 may be particularly desirable to maintain sufficient strength against bending in both the passenger-facing and forward-facing portions 112b, 112c.

Attention is now directed to the jacket 120, which has an inner portion 122, an outer portion 124, a locking assembly 142 for maintaining the outer portion 124 in various respective positions relative to the bracket 110, and at least one stop 152. The inner portion 122 is fastened to the outer portion 124 such that the two portions generally move together. But in crash situations, for example, it may be desirable for the inner portion 122 to move relative to the outer portion 124, and for energy to be absorbed through a bending strap 125 or another energy-absorbing member. Some energy-absorbing fastening systems which may be utilized in the adjustable steering column assembly 100 are disclosed, for example, in U.S. Pat. No. 8,474,869 to Sulser, assigned to THYSSENKRUPP PRESTA AKTIENGESELL-SCHAFT, the contents of which are incorporated herein in its entirety by reference. And some embodiments may omit such energy-absorbing structure entirely.

The outer portion 124 has a coupling section 126 for fastening to a vehicle's chassis or other environmental structure (such as through welding, bolts, or any other appropriate fastener, whether now known or later developed). The coupling section 126 is flexible to enable to tilt the inner portion 122 and outer portion 124 relative to the bracket 110 to realize a height adjustment. At least one axle passage 128 for cooperating with the locking assembly 142.

The axle passages 128 illustrated in FIG. 4 are circular and coaxial, and are positioned between the inner portion 122 and the bracket base 111.

The locking assembly 142 has a lever 144, a shaft 146 (also called a "clamping shaft"), and various devices for interacting with other elements and providing a locking effect, such as cam disc 147 and clamping device 148. The cam disc 147 is fixed on the lever 144. The clamping device 148 comprises a further cam disc, wherein the lever 144 and the cam disc 147 are rotatable relative to the cam disc of the clamping device 148 to lock the jacket relative to the bracket 111. The shaft 146 passes through and is supported by the axle passages 128, and nuts 149 or other appropriate devices keep the shaft 146 from separating from the jacket outer portion 124. In addition, the shaft 146 passes through the adjustment slots 112a, 113a of the bracket arms 112, 113 and thereby couples the jacket outer portion 124 to the bracket 110.

The lever 144 is coupled to the shaft 146 and may be used to rotate the shaft 146 as desired. Various locking assemblies are known in the art and may be utilized; one example is the securement device set forth in U.S. Pat. No. 8,474,869 to Sulser, assigned to THYSSENKRUPP PRESTA AKTIENG-ESELLSCHAFT, the contents of which are hereby incorporated by reference in their entirety. When the shaft 146 is not positioned to provide a locking effect, the shaft 146 may travel along the adjustment slots 112a, 113a. And springs 150 or other biasing members may bias the outer portion 124 toward a location relative to the bracket 110. When the shaft 146 is positioned to provide a locking effect, the jacket 120 remains stationary relative to the bracket 110. Again, those skilled in the art will appreciate that various locking assemblies may be used and that a specific locking assembly is insignificant in the current disclosure so long as there is a predetermined amount of travel allowed between the bracket 110 and the jacket 120.

The at least one stop 152 is located along the outer portion 124 of the jacket 120. While the adjustable steering column assembly 100 includes one stop 152 adjacent the bracket arm 112, other embodiments may additionally include a stop 152 adjacent the bracket arm 113. Very importantly, the stop 152 is not located in the adjustment slot 112a, as positioning the stop 152 inside the slot 112a would result in a reduced range of motion when compared to an unobstructed slot 112a. Instead, the stop 152 is located along the jacket outer portion 124 adjacent the forward-facing portion 112c, and more precisely in the void between the upper and lower brakes 114a, 114b.

The stop 152 is best shown in FIGS. 5 through 9 and has a main body 154 with first end 154a and a second end 154b. In this embodiment the first end 154a is a passenger-facing end 154a and the second end 154b is a forward-facing end 154b. As shown in FIG. 6, the passenger-facing end 154a may be inset from the forward-facing end 154b, such that a depth of the forward-facing end 154b is greater than a depth of the passenger-facing end 154a. An upper leaf spring 155 extends from the passenger-facing end 154a toward the forward-facing end 154b and defines an uppermost portion of the stop 152, and a lower leaf spring 156 extends from the passenger-facing end 154a toward the forward-facing end 154b and defines a lowermost portion of the stop 152. The upper and lower leaf springs 155, 156 may have a depth generally equivalent to the depth of the passenger-facing end 154a. It may be particularly desirable for the upper leaf spring 155 to extend from the main body 154 at an area 157a that is below an uppermost area 157b of the main body 154, and for the lower leaf spring 156 to extend from the main body 154 at an area 157c that is above a lowermost area 157d of the main body 154. The stop 152 may be constructed of resin, natural or synthetic rubber, and/or another polymer, and the stop 152 may or may not be homogeneous.

FIG. 4 shows that the stop 152 may have a clip 158 which passes through a hole in the jacket outer portion 124 to connect the clip 158 to the jacket outer portion. In other embodiments, the stop 152 may be coupled to the jacket outer portion 124 through other fasteners, such as bolts, adhesive, welding, et cetera.

In use, the driver may adjust the height of the steering shaft 102 (and accordingly the steering wheel and the jacket 120) by first adjusting the locking assembly 142 such that the jacket outer portion 124 is allowed to move relative to the bracket 120. More specifically, the shaft 146 is allowed to travel along the adjustment slots 112a, 113a of the bracket 120. Once the desired height is obtained, the locking assembly 142 is then adjusted such that the jacket outer portion 124 remains stationary relative to the bracket 120.

The stop 152 is located to contact the upper brake 114a before the shaft 146 reaches the end of the adjustment slot 112a as the jacket 120 is moved upwardly relative to the bracket 120 (i.e., toward the bracket base 111). More particularly, the stop 152 is located such that the upper leaf spring 155 contacts the upper brake 114a before the shaft 146 reaches an upper end of the adjustment slots 112a when the jacket 120 is moved upwardly relative to the bracket 110. As such, before the shaft 146 reaches the upper end of the adjustment slot 112a, force F1 (FIG. 8) is applied to the upper leaf spring 155 by the upper brake 114a, and the upper leaf spring 155 deforms, absorbing a portion of the force F1 and providing a cushioned limit for upward travel of the jacket 120. Because the upper leaf spring 155 has a side 155a that is inset from the forward-facing end 154b (so that the depth of the upper leaf spring 155 is less than the depth of the forward-facing end 154b), the side 155a does not interfere with the jacket outer portion 124 as the upper leaf spring 155 deforms.

Additionally, the stop 152 is located to contact the lower brake 114b before the shaft 146 reaches the end of the adjustment slot 112a as the jacket 120 is moved downwardly relative to the bracket 120 (i.e., away from the bracket base 111). More particularly, the stop 152 is located such that the lower leaf spring 156 contacts the lower brake 114b before the shaft 146 reaches a lower end of the adjustment slots 112a when the jacket 120 is moved downwardly relative to the bracket 110. As such, before the shaft 146 reaches the lower end of the adjustment slot 112a, force F2 (FIG. 9) is applied to the lower leaf spring 156 by the lower brake 114b, and the lower leaf spring 156 deforms, absorbing a portion of the force F2 and providing a cushioned limit for downward travel of the jacket 120. Because the lower leaf spring 156 has a side 156a that is inset from the forward-facing end 154b (so that the depth of the lower leaf spring 156a is less than the depth of the forward-facing end 154b), the side 156a does not interfere with the jacket outer portion 124 as the lower leaf spring 156 deforms.

While it may be desirable for the shaft 146 to not reach either end of the adjustment slot 112a, the shaft 146 may nevertheless come very close to the ends of the adjustment slot 112a; the adjustment slot 112a does not need to be (and may preferably not be) substantially longer than the amount of travel allowed to the shaft 146.

FIGS. 10 through 14 show an alternate stop 252 which may replace the stop 152 in the adjustable steering column assembly 100. The stop 252 is substantially similar to the stop 152, except as specifically noted and/or shown, or as would be inherent. Further, those skilled in the art will appreciate that the stop 152 (and thus the stop 252) may be modified in various ways, such as through incorporating all or part of any of the various described embodiments, for example. For uniformity and brevity, reference numbers from 252 to 299 may be used to indicate elements corresponding to those discussed above numbered from 152 to 199 (e.g., main body 254 corresponds generally to the main body 154, passenger-facing end 254a corresponds generally to the passenger-facing end 154a, forward-facing end 254b corresponds generally to the forward-facing end 154b, upper leaf spring 255 corresponds generally to the upper leaf spring 155, lower leaf spring 256 corresponds generally to the lower leaf spring 156, area 257a corresponds generally to the area 157a, area 257b corresponds generally to the area 157b, area 257c corresponds generally to the area 157c, area 257d corresponds generally to the area 157d, et cetera), though with any noted, shown, or inherent deviations.

Some differences between the stop 252 and the stop 152 are that an extension 265 extends from the upper leaf spring 255 and an extension 266 extends from the lower leaf spring 256. Each extension 265, 266 extends away from the forward-facing end 254b and toward the passenger-facing end 254a, and respective bends 265a, 266a couple the extensions 265, 266 to the leaf springs 255, 256. It may be particularly desirable for the extensions 265, 266 to have a higher spring rate than the upper and lower leaf springs 255, 256. And at an unstressed state, the extensions 265, 266 are spaced apart from the upper and lower leaf springs 255, 256.

In use, before the shaft 146 reaches the upper end of the adjustment slot 112a, force F3 (FIG. 11) is applied to the upper leaf spring 255 by the upper brake 114a and the upper leaf spring 255 deforms, absorbing a portion of the force F3 and providing a cushioned limit for upward travel of the jacket 120. If the applied force is sufficiently high, such as force F4 (FIG. 12), then after the upper leaf spring 255 absorbs a portion of the force F4 by deforming, the extension 265 absorbs another portion of the force F4 by deforming. And before the shaft 146 reaches the lower end of the adjustment slot 112a, force F5 (FIG. 13) is applied to the lower leaf spring 256 by the lower brake 114b and the lower leaf spring 256 deforms, absorbing a portion of the force F5 and providing a cushioned limit for downward travel of the jacket 120. If the applied force is sufficiently high, such as force F6 (FIG. 14), then after the lower leaf spring 256 absorbs a portion of the force F6 by deforming, the extension 266 absorbs another portion of the force F6 by deforming.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A steering column assembly for use with a vehicle, comprising:
   a steering shaft;
   a bracket comprising a base and a first arm extending from the base; the base being configured to be anchored to a chassis of the vehicle; the first arm having an adjustment slot; the first arm having upper and lower brakes separated from one another by empty space;
   a jacket rotatably supporting the steering shaft; the jacket having an inner portion, an outer portion, and a locking assembly for maintaining the jacket in various respective positions relative to the bracket; the outer portion having an axle passage positioned between the inner portion and the bracket base; the locking assembly having a shaft passing through the axle passage and the adjustment slot of the first arm; and
   a stop located along the jacket adjacent the first arm in the empty space between the upper and lower brakes; the stop being located away from the adjustment slot of the first arm; the stop having a main body, an upper leaf spring extending above the main body, and a lower leaf spring extending below the main body.

2. The steering column assembly of claim 1, wherein:
   the main body has a first end and a second end;
   the upper leaf spring extends from the first end toward the second end;
   the lower leaf spring extends from the first end toward the second end;
   the stop is located such that the stop contacts the upper brake before the shaft reaches an upper end of the adjustment slot when the jacket is moved upwardly relative to the bracket; and
   the stop is located such that the stop contacts the lower brake before the shaft reaches a lower end of the adjustment slot when the jacket is moved downwardly relative to the bracket.

3. The steering column assembly of claim 2, wherein the upper leaf spring extends from an area of the main body that is below an uppermost area of the main body.

4. The steering column assembly of claim 2, wherein the lower leaf spring extends from an area of the main body that is above a lowermost area of the main body.

5. The steering column assembly of claim 1, wherein at least one item selected from the group consisting of a clip, a bolt, a weld, and adhesive couples the stop to the jacket outer portion.

6. The steering column assembly of claim 1, wherein the bracket has a stiffener located between the adjustment slot of the first arm and the empty space between the upper and lower brakes, the stiffener extending from the bracket base.

7. The steering column assembly of claim 1, wherein the stop further comprises:
   a first extension extending from the upper leaf spring in a direction away from the second end and toward the first end; and
   a second extension extending from the lower leaf spring in a direction away from the second end and toward the first end.

8. The steering column assembly of claim 7, wherein:
   a first bend couples the first extension to the upper leaf spring; and
   a second bend couples the second extension to the lower leaf spring.

9. The steering column assembly of claim 8, wherein:
   a spring rate of the first extension is greater than a spring rate of the upper leaf spring; and
   a spring rate of the second extension is greater than a spring rate of the lower leaf spring.

10. The steering column assembly of claim 1, wherein:
the main body of the stop touches the jacket outer portion;
the upper leaf spring does not touch the jacket outer portion; and
the lower leaf spring does not touch the jacket outer portion.

11. The steering column assembly of claim 1, wherein the stop is constructed of at least one material selected from the group consisting of resin, natural rubber, synthetic rubber, and other polymers.

12. A steering column assembly for use with a vehicle, comprising:
a steering shaft;
a bracket comprising a base and a first arm extending from the base; the base being configured to be anchored to a chassis of the vehicle; the first arm having an adjustment slot and upper and lower brakes separated from one another by empty space;
a jacket rotatably supporting the steering shaft; the jacket having an inner portion, an outer portion, and a locking assembly for maintaining the jacket in various respective positions relative to the bracket; the outer portion having an axle passage positioned between the inner portion and the bracket base; the locking assembly having a shaft passing through the axle passage and the adjustment slot of the first arm; and
a stop located along the jacket adjacent the first arm in the empty space between the upper and lower brakes; the stop having a main body with a first end and a second end, an upper leaf spring extending above the main body, and a lower leaf spring extending below the main body; the upper leaf spring extending from the first end toward the second end; the lower leaf spring extending from the first end toward the second end;
wherein the stop is located such that the stop contacts the upper brake before the shaft reaches an upper end of the adjustment slot when the jacket is moved upwardly relative to the bracket; and
wherein the stop is located such that the stop contacts the lower brake before the shaft reaches a lower end of the adjustment slot when the jacket is moved downwardly relative to the bracket.

13. The steering column assembly of claim 12, wherein:
the main body of the stop touches the jacket outer portion;
the upper leaf spring does not touch the jacket outer portion; and
the lower leaf spring does not touch the jacket outer portion.

14. The steering column assembly of claim 12, wherein:
the stop is located such that the upper leaf spring contacts the upper brake before the shaft reaches an upper end of the adjustment slots when the jacket is moved upwardly relative to the bracket; and
the stop is located such that the lower leaf spring contacts the lower brake before the shaft reaches a lower end of the adjustment slots when the jacket is moved downwardly relative to the bracket.

15. The steering column assembly of claim 12, wherein the bracket has a stiffener located between the adjustment slot of the first arm and the empty space between the upper and lower brakes, the stiffener extending from the bracket base.

16. The steering column assembly of claim 12, wherein the stop further comprises:
a first extension extending from the upper leaf spring in a direction away from the second end and toward the first end; and
a second extension extending from the lower leaf spring in a direction away from the second end and toward the first end.

17. The steering column assembly of claim 16, wherein:
a first bend couples the first extension to the upper leaf spring; and
a second bend couples the second extension to the lower leaf spring.

18. The steering column assembly of claim 17, wherein:
a spring rate of the first extension is greater than a spring rate of the upper leaf spring; and
a spring rate of the second extension is greater than a spring rate of the lower leaf spring.

19. The steering column assembly of claim 18, wherein the bracket has a stiffener located between the adjustment slot of the first arm and the empty space between the upper and lower brakes, the stiffener extending from the bracket base.

20. The steering column assembly of claim 19, wherein:
the main body of the stop touches the jacket outer portion;
the upper leaf spring does not touch the jacket outer portion; and
the lower leaf spring does not touch the jacket outer portion.

* * * * *